United States Patent [19]

Hervert et al.

[11] 3,785,781

[45] Jan. 15, 1974

[54] APPARATUS FOR CATALYTICALLY CONVERTING FLUID

[75] Inventors: George L. Hervert, Woodstock; Robert D. Carnahan, Barrington; Karl J. Youtsey, Chicago, all of Ill.

[73] Assignee: Universal Oil Products Company, Des Plaines, Ill.

[22] Filed: Oct. 4, 1971

[21] Appl. No.: 186,126

[52] U.S. Cl. ................. 23/288 F, 60/299, 423/212, 252/477
[51] Int. Cl. ............................................. B01j 9/04
[58] Field of Search ................... 423/212, 213, 214; 252/477; 23/288; 60/299

[56] References Cited
UNITED STATES PATENTS

| | | | |
|---|---|---|---|
| 3,397,154 | 8/1968 | Talsma | 423/214 X |
| 3,208,131 | 9/1965 | Ruff et al. | 252/477 R |
| 1,919,626 | 7/1933 | Finn | 23/288 F |

Primary Examiner—G. O. Peters
Attorney—James R. Hoatson, Jr. et al.

[57] ABSTRACT

Method and means of catalytically converting fluids such as exhaust gases. The fluid is passed through a catalytically active first skeletal material zone having a plurality of flow paths in the direction of flow of predetermined cross-sectional dimensions. Immediately after withdrawing the fluid from the first skeletal material zone, the fluid is passed through an adjacent second skeletal zone having a plurality of flow paths in the direction of flow of larger cross-sectional dimensions than the flow paths of the first skeletal material zone. Immediately after withdrawing the fluid from the second zone the fluid is passed through an adjacent catalytically active third zone of skeletal material having flow paths in the direction of flow of smaller cross-sectional dimensions than the flow paths of the second zone.

3 Claims, 3 Drawing Figures

PATENTED JAN 15 1974　　　　　　　　　　3,785,781

INVENTORS:
GEORGE L. HERVERT
ROBERT D. CARNAHAN
KARL J. YOUTSEY
BY: James R. Hoatson, Jr.
Ronald H. Hausch
ATTORNEYS

APPARATUS FOR CATALYTICALLY CONVERTING FLUID

BACKGROUND OF THE INVENTION

The present invention is directed to the method and means of catalytically converting a fluid. More particularly, it is directed to method and means of catalytically converting a fluid such as exhaust gases by passing such fluid through a catalytically active first skeletal material zone having a plurality of flow paths in the direction of flow, through a second similar zone of larger flow paths which may or may not be catalytically inactive, and through a third catalytically active zone of smaller flow paths than the second zone.

The use of catalysts in catalytically active zones to promote chemical reactions has received extensive attention in commercial processes and in the control of air pollution. For many years considerable research has been devoted to the discovery and improvement of catalytic materials which will accelerate desired chemical conversions with the idea that for most reactions there is some material or composition of material which will catalyze and promote the reactions more efficiently and economically than known methods of catalysis. Concurrent with the increasing use of catalysts has been the development of catalytic apparatus. Numerous types of such apparatus and methods of employing catalytic material have been proposed. Thus, catalytic materials have been prepared as gels, powders, pellets, and other forms and have been arranged in solid beds, layers, spaced beds, tubes, suspensions, and other manners. Such forms and manners of arrangement have been more or less satisfactory, the particular form and arrangement depending to some extent upon the particular catalytic material being used and the operation in which it is being used, but more efficient ways are constantly being sought.

In recent years, the desirability of removing or converting noxious compounds of exhaust gases from automobiles, trucks, etc., has been generally well established. The unavoidable incomplete combustion of hydrocarbon fuel via gasoline or diesel engine results in a generation of substantial quantities of unburned hydrocarbons, oxides of nitrogen, and other undesirable products, which as waste products discharge into the atmosphere through the exhaust line. With the ever-increasing concentration of automobiles, particularly in urban areas, the resulting accumulation of these undesirable products in the atmosphere may reach high proportions. These combustion products are known to react with atmospheric gases to produce smog or pollution. Such waste products include, for example, saturated and unsaturated hydrocarbons, carbon monoxide, aromatics, partially oxygenated hydrocarbons, such as aldehydes, ketones, alcohols, and acids as well as oxides of nitrogen and sulfur. In a catalytic operation, hot gases issuing from the engine exhaust manifold are passed through a catalytic zone maintained within a converter, so as to effect a more or less complete conversion of the waste products in the exhaust to a harmless state.

One of the problems of past systems which utilize honeycomb or skeletal material as the catalyst support, is the apparent loss of activity per unit length when thicknesses of material greater than a certain length are used. In other words, under certain conditions, one inch of material may result in 60 percent conversion. Under the same conditions, three inches of such material may result in only 65 percent conversion. We have found this to occur because mass transfer limiting boundary layers form in the downstream area of the honeycomb material after entry effects have disappeared. The present invention minimizes this effect.

SUMMARY OF THE INVENTION

It is thus a principal object of the present inventon to provide for the method and means for catalytically converting fluids such as exhaust gases.

It may also be considered an object of this invention to provide for the method and means of catalytically converting exhaust gases of an internal combustion engine utilizing honeycomb as support material.

Thus, in one of its broadest aspects the present invention provides for a catalytic element for contacting and converting a fluid comprising in combination a catalytically active first skeletal structure having a plurality of flow paths in the direction of flow of predetermined cross-sectional dimension; an adjacent second skeletal structure contacting said first skeletal structure and having a plurality of flow paths in the direction of fluid flow of larger cross-sectional dimensions than the flow paths of said first skeletal structure, and an adjacent catalytically active third skeletal structure contacting said second skeletal structure having a plurality of flow paths in the direction of flow of smaller cross-sectional dimensions than the flow paths of said second skeletal structure.

The second skeletal structure may be catalytically inactive, preferably, however, the skeletal strucutre is made catalytically active to further increase the capability of the element.

Another aspect of this invention provides for a catalytic converter for converting fluids comprising in combination: (a) an outer housing; (b) inlet means connected to said housing for introducing fluid therein; (c) outlet means connected to said housing for discharging of converted fluid therefrom; and, (d) a catalyst element supported in said housing; (e) said catalyst element including a catalytically active first skeletal structure having a plurality of flow paths in the direction of flow of predetermined cross-sectional dimensions; an adjacent second skeletal structure contacting said first skeletal structure having a plurality of flow paths in the direction of flow of larger cross-sectional dimensions than the flow paths of said first skeletal structure; and an adjacent catalytically active third skeletal structure contacting said second skeletal structure having a plurality of flow paths in the direction of flow of smaller cross-sectional dimensions than the flow paths of said second skeletal structure.

In a preferred embodiment, barrier means is provided upstream of the inlet perforate side of the catalyst element for preventing a fluid flow through the perimeter openings of the structure. Thus, in effect, there is an insulating portion around the periphery of the skeletal structure to prevent loss of heat through the sides of the housing. Again, the second skeletal structure may be made to be catalytically active.

In another aspect of the present invention provides for a method of catalytically converting fluids comprising the steps of: (a) passing said fluid through a first catalytically active zone of skeletal material having flow paths in the direction of flow of predetermined cross-sectional dimensions; (b) immediately upon withdrawing the fluid from the first catalytically active zone passing said fluid through an adjacent second zone of skeletal material having flow paths in the direction of flow of larger predetermined cross-sectional dimensions than the flow paths of said first catalytically active zone; and (c) immediately after withdrawing the fluid from the said adjacent second zone of skeletal material, passing said fluid through an adjacent catalytically active third zone of skeletal material having flow paths in the direction of flow of smaller cross-sectional dimensions than the flow paths of the immediately adjacent zone of skeletal material.

Reference to the accompanying drawing and the following description thereof will serve to more fully illustrate the present invention as well as to set forth additional advantageous features in connection therewith.

DESCRIPTION OF THE DRAWING

Referring now to FIG. 1 of the drawing there is shown an elevational view of a catalytic reactor or converter which may be used for the conversion of exhaust gases. Converter 1 is comprised of an outer housing 2 havkng a central tubular portion 3 and two end closure sections 4 and 5. Because of ease in fabrication, the preferred cross-section of the housing 2 is circular; however, this should not be limiting upon the present invention. Other shapes are contemplated such as rectangular, oval and the like. Reactor 1 is further comprised of an inlet 6 and an outlet 7 for introducing and discharging the gases therein. Of course both inlet and outlet means communicate through the housing 2 into the interior thereof. End closure means 4 and 5 have inwardly facing flanged end sections 8 and 9 respectively which are used to support a catalyst element 30. Openings 10 and 11 are provided in end closure means 4 and 5 respectively.

Figure 1:
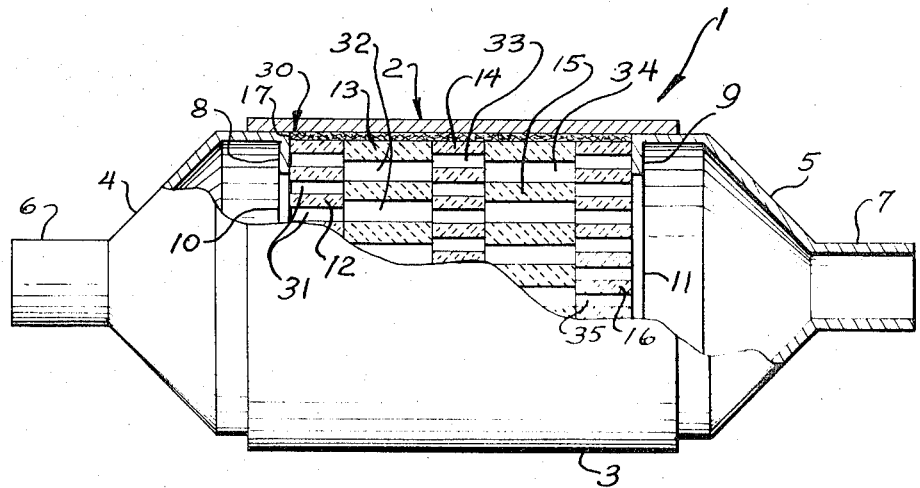
FIG. 1 of the drawing is an elevational sectional view of a preferred embodiment of the converter of the present invention.

The catalyst element 30 is comprised of a catalytically active first skeletal structure 12 having a plurality of flow paths 31 extending therethrough, a second skeletal strucure 13 having a plurality of flow paths 32 extending therethrough, a catalytically active third skeletal structure 14 having a plurality of flow paths 33 extending therethrough, a fourth skeletal structure 15 having a plurality of flow paths 34 extending therethrough and a catalytically active fifth skeletal structure 16 having a plurality of flow paths 35 extending therethrough. Of course all of the flow paths are arranged to provide communication between adjacent skeletal structures in the general direction of the fluid flow. It should be noted from the schematic illustration that the channels or flow paths in elements 12, 14, and 16 are of smaller cross-sectional dimensions than the flow paths of elements 13 and 15. The schematic illustration shows an exaggeration of what the size of these path openings would be. In typical honeycomb material, for example, the smaller sized paths may be disposed with perhaps about 250 to about 500 channels or flow paths per square inch while the larger size flow paths may be disposed at a rate of about 50 to about 150 flow paths per square inch.

Figure 2:
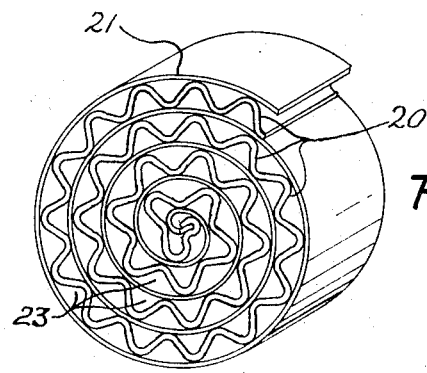
FIG. 2 of the drawing is a pictorial view of honeycomb structure which may be utilized in connection with the present invention.

The skeletal structure, which is sometimes referred to as a honeycomb material, is well known to those skilled in the art. There are various kinds on the market and major U.S. manufacturers include American Lava Corporation, a subsidiary of 3M Corporation, E. I. DuPont Inc., and Corning Glass Company. Honeycomb or skeletal material as used herein in general refers to a unitary inert refractory skeletal structure which is characterized by having a large plurality of gas flow paths extending through the material in the direction of fluid flow. The openings may be substantially parallel and extend through the support from one side to the opposite, with such openings being separated from one another by preferably thin walls defining openings. Reference should be made to FIG. 2 of the drawing for one example of such a structure where it is seen that the honeycomb is comprised of a layer of corrugated film 20 and a sheet adhere together to form the honeycomb material. The result is that a plurality of unobstructed flow paths 23 are formed. Reference should be made to Johnson U.S. Pat. No. 3,344,925 for a more complete description of the method of making this particular hoenycomb configuration. Alternatively, a network of flow paths may permeate the structure so as to form a tortuous flow path such as a cross flow grade of honeycomb materials sold under the registered trademark of Torvex manufactured by DuPont Corp. The particular honeycomb structure shown in FIG. 2 is an American Lava configuration.

Typically, the path openings of honeycomb material are distributed across the entire face of the material and are subject to initial contact with the gas or fluid to be reacted. The paths can be of any shape and size consistent with the desired superficial surface area. The cross-sectional shape of the path can be, for example a trapezoid, rectangle, square, sine-wave, circle, and other cross-section that shows repeating patterns that can be described as a honeycomb, corrugated, or lattice material, since it is not the intent of this invention to limit the shape and size.

Likewise, it is not intended to limit the honeycomb material to any particular composition. The main features of the material to be used is that it should be able to withstand the stresses it will experience in the reactor to which it is used. Also, preferably, it should be able to support a catalyst or act as a catalyst. Suitable materials include silica-alumina-magnesia (cordierite), aluminum oxide, lithium, aluminum silicates, magnesium alumina silicates and the like.

As was mentioned before, preferably honeycomb structures 12 and 14 are made catalytically active to increase the overall reactor efficiency. The honeycomb structures generally must be treated to obtain catalytic activity. The catalyst used for the reaction will have to be one to catalyze that particular reaction. It may be any one of the well known catalyst materials used; as for example, suitable oxidation catalysts including the oxides of the meals of Groups I, V VII and VIII of the Periodic Table, particularly chromium, copper, nickel and platinum. The application of this catalyst to the honeycomb support can be effected in many ways, for example by immersing the structure in an aqueous solution of a water-soluble inorganic salt or salts of the particular metal or metals, with agitation. The metal oxide can be reduced, if the metal form catalyst is desired, by contacting the same with a reducing gas such as hydrogen at elevated temperatures. To provide more surface area, the skeletal structure or honeycomb may be first coated with a surface extending refractory oxide, such as alumina, silica-alumina, zirconia silica-boria, silica-boria, and the like. The honeycomb material of course must be thick enough to be able to support itself for the particular diameter or width utilized.

We have found that when hoheycomb is used as a catalyst or catalyst support, most of the conversion takes place in tee entry region of the material. This is because typically entry flow into a catalyst zone such as a skeletal structure as illustrated in FIG. 2 results in an initial square velocity profile normal to the main flow direction. The square profile is converted to a parabolic one after a characteristic entry length for zones in which laminar flow is at normal fluid condition. The establishment of a parabolic velocity profile results in a boundary layer consisting of a stopped or slowly moving fluid in the immediate neighborhood of the catalyst surface. The extent of reaction in this stagnant layer leads to the rapid establishment of a steep concentration gradient with respect to the core of the fluid flow. The characteristic entry length is greater for entrant turbulent flow than for entrant laminar flow. An increased overall reaction or conversion rate is achieved when a square reactant concentration profile is maintained in the reactor, regardless of whether the dynamic condition of the flow is turbulent of laminar, although turbulent flow will insure such as profile for a greater distance through the channels. Thus, the optimum design of the first catalytically active zone limits the zone length of the characteristic entry length. The length of this active element should be such that a mass transfer limiting concentration gradient is just established and the length of the element 13 is such that a square concentration profile is reestabished prior to entry into the next catalytically active zone 14. The larger cros-section of dimensions of the path openings 32 in zone 13 interrupts the boundary layer of zone 12 and allows the square concentration profile to be reestablished prior to entry into zone 14 of smaller cross-sectional dimensions. The square concentration profile is reestablished by either or both of the following mechanisms: mixing by diffusional mass transfer and mixing caused by element interfacing mismatching. This same analysis is made with respect to element 14, 15 and 16. That is, in element 14 the square reactant concentration profile diminishes and just as a mass transfer limiting concentration gradient is established the fluid is introduced into element 15 wherein the square concentration profile is reestablished prior to entry into element 16.

The advantages of this particular arrangement over a spaced honeycomb concept is that thinner active elements can be used without loss of reactor mechanical strength because element 30 may have greater mechanical strength than any of the individual elements have supported by themselves. Also the channel diameters in the respective elements can be varied to acieve specific design objectives. For example, the initial active element might consist of a material with very small channel diameters to promote reactor light off. Also the assembly in fabrication procedure is greatly simplified.

Figure 3:
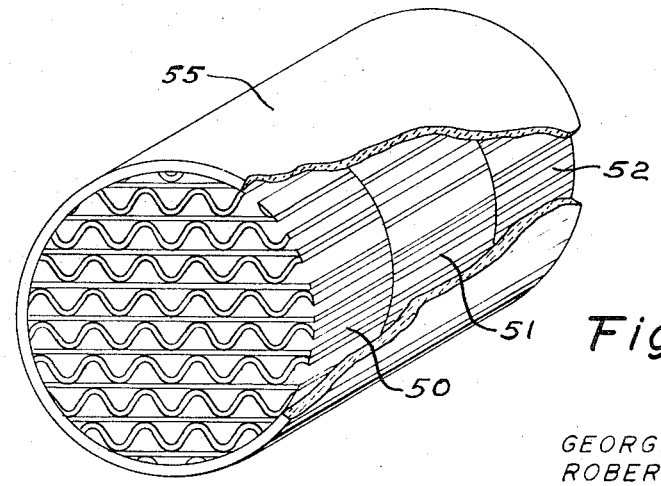
FIG. 3 of the drawing is a pictorial view of one embodiment of the catalytic element of the present invention.

The honeycomb material may be placed individually into the reactor or on the other hand may be preformed into a single element prior to insertion into the reactor. For example in FIG. 3 there is shown a sequence of elements that are arranged in the desired order. The corresponding channel sizes are not shown but it is assumed tht they fall within the scope of the invention. That is element 50 has smaller channel sizes than element 51 and element 52 has smaller channel sizes than 51. The elements 52 may then be wrapped with a ceramic wrapping material 55 which may be in the form of the same material used to make the elements themselves. If necessary the wrapping material may be heated to set the shape thereof. The elements 50, 51 and 52 may be impregnated with the catalytically active material prior to the wrapping of the wrapper 55 but on the other hand a package may be impregnated as one piece and heat treated thereafter.

Referring again to FIG. 1 of the drawing it is noted that the honeycomb material is spaced from the housing and in the space there is provided packing 17 to take up any relative expansion of the housing and the honeycomb material and also to provide for greater dimensional tolerance in manufacturing procedures. It is also noted that the flanged portion 8 of the end closure means 4 overlaps the peripheral edge of the honeycomb material. This has the effect of blocking flow through the perimeter openings in the honeycomb which thus establishes a layer of insulation to protect the outer housing from extreme heat.

It is recalled that the flow through the honeycomb material used is such that the square reactant profile goes parabolic aftr a short distance into the material. Thus, by using optimum lengths of honeycomb material it was seen that the square reactant concentration profile can be maintained by reestablishment through much of the length of element 30.

After the fluid leaves the first hoenycomb material it is subjected to a redistribution and mixing to reestablish a substantially square reactant concentration profile prior to entry into the third element. This is repeated through succeeding elements of material.

From the foregoing description it is seen that the present invention provides for the method and means of catalytically converting a fluid which comprises the steps of passing such fluid through a catalytically active first skeletal zone having a plurality of flow paths in the direction of flow, then through a second similar flow of larger flow paths, and finally through a third zone of smaller flow paths than in the second zone. The embodiment of FIG. 1 illustrates an expanded version of the broader concept with two additional zones added. It is contemplated that the steps be repeated more than shown and stilll fall within the scope of the present invention. It should be understood that many variations of strucure configurations illustrated in the drawing are possible without departing from the essential features of this invention. The present invention is not intended to be limited to any particular description or exemplary arrangement disclosed merely to describe the invention more fully. We claim as our invention:

1. A catalytic converter for converting fluids comprising in combination:
 a. an outer housing;
 b. inlet means connected to said housing for introducing fluid therein;
 c. outlet means connected to said housing for discharging of converted fluid therefrom;

d. a catalyst element supported in said housing; and, e. said catalyst element including a catalytically active first skeletal structure having a first plurality of flow paths in the direction of flow of predetermined cross sectional dimensions; said first plurality of flow paths comprising from about 250 to about 500 channels per square inch; an adjacent second skeletal structure contacting said first skeletal structure having a second plurality of flow paths in the direction of flow of larger cross-sectional dimensions; said second plurality of flow paths comprising from about 50 to about 150 channels per suare inch; (than the flow paths of said first skeletal structure) and an adjacent catalytically active third skeletal structure contacting said second skeletal structure having a plurality of flow paths in the direction of flow of cross-sectional dimensions the same as said first defined plurality of flow paths.

2. The converter of claim 1 further characterized in that said second skeletal structure is catalytically active.

3. The converter of claim 1 further characterized in that barrier means is provided around the peripheral edge of the first skeletal structure for blocking fluid flow through the peripheral flow paths thereof.

* * * * *

UNITED STATES PATENT OFFICE
CERTIFICATE OF CORRECTION

Patent No. 3,785,781　　　　　　　　Dated January 15, 1974

Inventor(s) George L. Hervert et al.

It is certified that error appears in the above-identified patent and that said Letters Patent are hereby corrected as shown below:

Column 7, line 14, cancel "(than the flow paths of said first"

Column 8, line 1, cancel "skeletal structure)"

Signed and sealed this 18th day of June 1974.

(SEAL)
Attest:

EDWARD M. FLETCHER, JR.　　　　　　C. MARSHALL DANN
Attesting Officer　　　　　　　　　Commissioner of Patents